(12) United States Patent
Boykov et al.

(10) Patent No.: US 11,023,262 B2
(45) Date of Patent: Jun. 1, 2021

(54) SYSTEM AND METHOD FOR CONTENT-BACKED USER INTERFACE SNIPPETS

(71) Applicant: Samsung Electronics Co., Ltd., Suwon-si (KR)

(72) Inventors: Artem Boykov, San Jose, CA (US); Sojan Ponthanplavil Razallian, Sunnyvale, CA (US); Shankar Narayan Venkatesan, Santa Clara, CA (US); Akshat Sehgal, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 16/267,082

(22) Filed: Feb. 4, 2019

(65) Prior Publication Data

US 2020/0142717 A1   May 7, 2020

Related U.S. Application Data

(60) Provisional application No. 62/756,255, filed on Nov. 6, 2018.

(51) Int. Cl.
```
G06F 3/048      (2013.01)
G06F 9/451      (2018.01)
G06F 3/0484     (2013.01)
G06F 16/904     (2019.01)
G06F 16/9032    (2019.01)
G06F 9/54       (2006.01)
```

(52) U.S. Cl.
CPC ............ *G06F 9/451* (2018.02); *G06F 3/0484* (2013.01); *G06F 9/54* (2013.01); *G06F 16/904* (2019.01); *G06F 16/9032* (2019.01)

(58) Field of Classification Search
CPC ............ G06F 9/451; G06F 16/40; G06F 9/54
See application file for complete search history.

(56) References Cited

U.S. PATENT DOCUMENTS

| | | |
|---|---|---|
| 8,484,224 B1 | 7/2013 | Harris et al. |
| 2004/0187080 A1* | 9/2004 | Brooke ................. G06F 40/154 715/239 |
| 2007/0038931 A1 | 2/2007 | Allaire et al. |

(Continued)

OTHER PUBLICATIONS

International Search Report and Written Opinion of the International Searching Authority for International Patent Application No. PCT/KR2019/004205 dated Aug. 5, 2019, 10 pages.

*Primary Examiner* — Claudia Dragoescu

(57) ABSTRACT

An electronic device for providing content-backed user interface snippets includes a memory and at least one processor coupled to the memory. The at least one processor is configured to transmit a content query for content in a domain to a content owner, receive a user interface object including display content and user interface data from the content owner, validate the user interface object according to display parameters, and display the display content. The at least one processor may also be configured to receive at least one user input associated with the display content and trigger at least one action based on the at least one user input. The at least one processor may further be configured to display the display content in a host application presentation layer of the electronic device.

20 Claims, 11 Drawing Sheets

(56) References Cited

U.S. PATENT DOCUMENTS

| | | |
|---|---|---|
| 2007/0260671 A1 | 11/2007 | Harinstein et al. |
| 2010/0077324 A1* | 3/2010 | Harrington ............. G06F 9/451 715/762 |
| 2010/0180205 A1 | 7/2010 | Deshpande et al. |
| 2013/0014169 A1* | 1/2013 | Sansom .............. G06F 16/7867 725/48 |
| 2014/0223288 A1 | 8/2014 | Chandra |
| 2016/0034260 A1 | 2/2016 | Ristock et al. |
| 2017/0032138 A1 | 2/2017 | Navda et al. |
| 2018/0074800 A1 | 3/2018 | Sabharwal et al. |

\* cited by examiner

SYSTEM AND METHOD FOR CONTENT-BACKED USER INTERFACE SNIPPETS

CROSS-REFERENCE TO RELATED APPLICATION AND CLAIM OF PRIORITY

This application claims priority under 35 U.S.C. § 119(e) to U.S. Provisional Patent Application No. 62/756,255, filed on Nov. 6, 2018 and entitled "System and Method for Content Backed User Interface Snippets." This provisional patent application is hereby incorporated by reference in its entirety.

TECHNICAL FIELD

This disclosure relates generally to content sharing systems. More specifically, this disclosure relates to a system and method for content-backed user interface snippets.

BACKGROUND

Accessing and sharing content and user interface components between applications is becoming increasingly important. Existing solutions for content sharing do not allow the owner of the content to control the presentation and only allow for content to be presented in a host defined format, and the presentation is entirely controlled by the host. Existing solutions for user interface sharing provide the host with limited options for controlling the presentation, do not provide a mechanism for adding actual content to a user interface, require the host to validate the content, and do not provide the host a mechanism to define a presentation strategy such as ranking and relevance.

SUMMARY

This disclosure provides a system and method for content-backed user interface snippets.

In one embodiment, an electronic device is provided. The electronic device includes a memory and at least one processor coupled to the memory. The at least one processor is configured to transmit a content query for content in a domain to a content owner, receive a user interface object including display content and user interface data from the content owner, validate the user interface object according to display parameters, and display the display content.

In another embodiment, a method is provided. The method includes transmitting a content query for content in a domain to a content owner, receiving a user interface object including display content and user interface data from the content owner, validating the user interface object according to display parameters, and displaying the display content.

In yet another embodiment, a non-transitory computer readable medium embodying a computer program for operating an electronic device including a memory and at least one processor is provided. The computer program includes computer readable instructions that, when executed by the at least one processor, cause the electronic device to transmit a content query for content in a domain to a content owner, receive a user interface object including display content and user interface data from the content owner, validate the user interface object according to display parameters, and display the display content.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
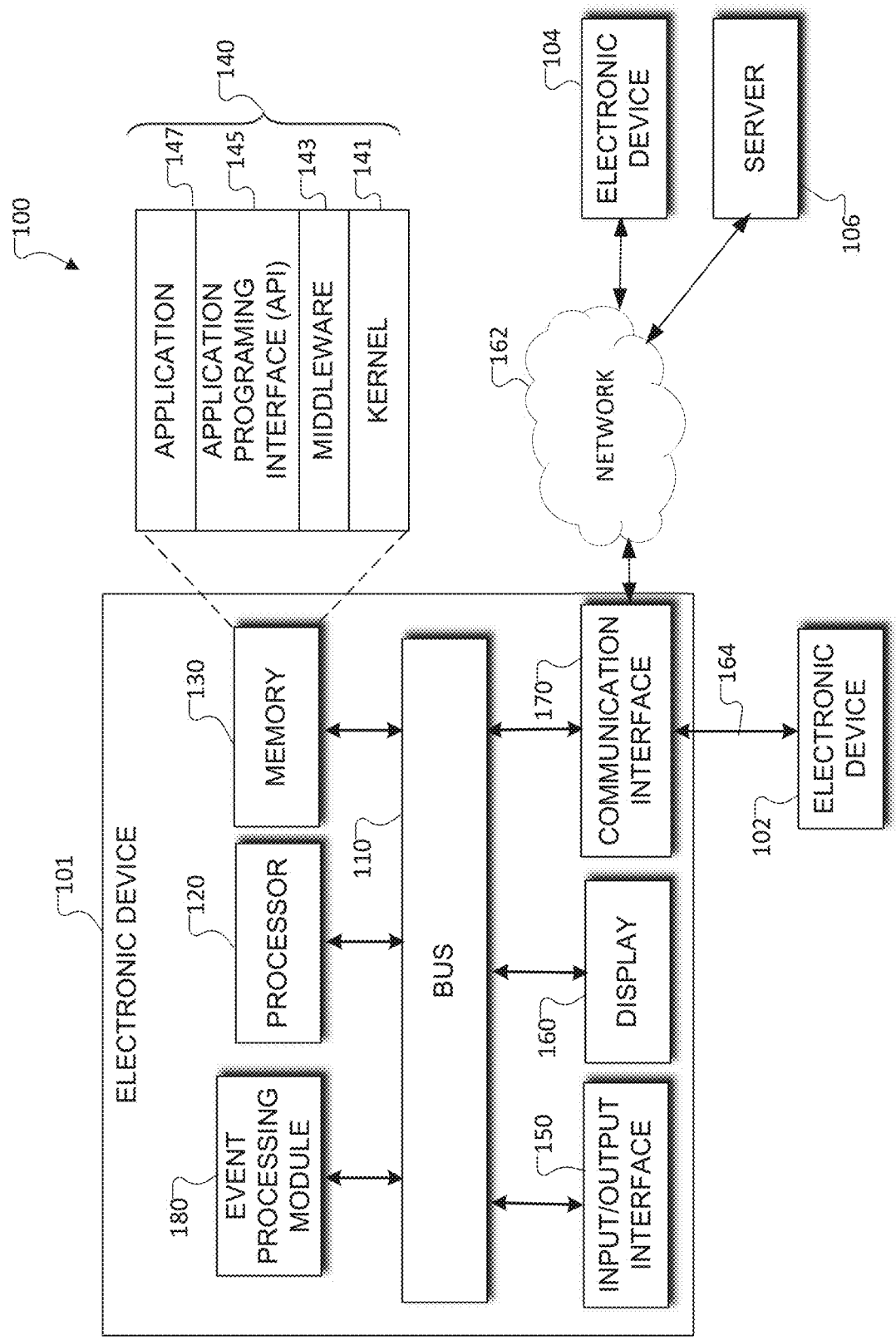
FIG. 1 illustrates an example network configuration in accordance with various embodiments of this disclosure.

FIGS. 1 through 11, discussed below, and the various embodiments of this disclosure are described with reference to the accompanying drawings. However, it should be appreciated that this disclosure is not limited to the embodiments and all changes and/or equivalents or replacements thereto also belong to the scope of this disclosure. The same or similar reference denotations may be used to refer to the same or similar elements throughout the specification and the drawings.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

"Content backed" means a dynamic linking to content provided by a content owner used to populate a user interface or user interface snippet with content, and as further defined by this disclosure. "Content host" means an entity, such as an application, that hosts or presents one or more content items or user interface snippets, and as further defined by this disclosure. "Content owner" or "content provider" means an entity that provides content or information for display, such as an application or server, and may be a third-party to the user and the content host, and as further defined by this disclosure. "User interface snippet" means a structure that includes content for display, such as raw content objects, content schema, images, text, and/or other content, one or more presentation user interface components, and/or display parameters, such as content display specifications and/or custom display markups (content display manifests), for displaying the content in a particular arrangement, and as further defined by this disclosure. "Content schema" means a structured representation of domain-specific content with predefined properties and can be pre-filled with any known data, and as further defined by this disclosure. "Domain" means the type of content or type of content owner, and as further defined by this disclosure. "Display specification" means a representation of a display surface's dimensions and other features that can be used to ensure presentation compliance with the display surface, and as further defined by this disclosure.

"Presentation user interface component" means a user interface component associated with content for display that can include a content display specification or other parameters for the display of content, and as further defined by this disclosure. "Custom display markup" or "content display manifest" means a structure for defining custom presentation formats for content schema and specifying the generic presentation formats with a mapping to content properties, and is used to present the content when there is not a presentation user interface component or when a presentation user interface component does not match the presentation parameters of a content host, and as further defined by this disclosure. "Content request" or "content query" means a request for content transmitted to a content provider, and that can include various query parameters, such as a content display specification, a uniform resource identifier, a slice uniform resource identifier, for requesting and displaying remote content, and as further defined by this disclosure.

"Inter-app data transfer mechanism means an asynchronous channel for transmitting queries from a content host to a content owner and for providing content to the content host from the content owner, and as further defined by this disclosure. "Content display specification validator" means a logical structure that validates content backed user interface snippets received by a content host from one or more content providers, such as validating that a user interface snippet complies with a display specification of the content host, and as further defined by this disclosure. "Content validation criteria" means criteria a content host uses to validate that user interface snippets are compliant with content host display specifications, and as further defined by this disclosure.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

As noted above, accessing and sharing content and user interface components between applications is becoming increasingly important. Existing solutions for content sharing do not allow the owner of the content to control the presentation and only allow for content to be presented in a host defined format, and the presentation is entirely controlled by the host. Existing solutions for user interface sharing provide the host with limited options for controlling the presentation, do not provide a mechanism for adding actual content to a user interface, require the host to validate the content, and do not provide the host a mechanism to define a presentation strategy such as ranking and relevance. The various embodiments of this disclosure provide systems and methods for content owners to control the user interface, while providing the host or content hosting application structured content associated with the presented user interface. The various embodiments of this disclosure therefore allow for the presentation of shared content to be mutually controlled by the content provider and the host.

FIG. 1 illustrates an example network configuration 100 in accordance with various embodiments of this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network environment 100. The electronic device 101 can include at least one of a bus 110, a processor 120, a memory 130, an input/output (IO) interface 150, a display 160, a communication interface 170, or an event processing module 180. In some embodiments, the electronic device 101 may exclude at least one of the components or may add another component.

The bus 110 includes a circuit for connecting the components 120 to 180 with one another and transferring communications (such as control messages and/or data) between the components. The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor can be a graphics processor unit (GPU). In accordance with various embodiments of this disclosure, the processor 120 can control the electronic device 101 to send content queries to one or more content owners to request content-backed user interface snippets that include content such as text, images, or other data, along with user interface information. The processor 120 can also control the electronic device 101 to process the content-backed user interface snippets and present them in a presentation layer of a host application.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or a memory 130) used to perform operations or functions implemented in other programs (such as the middleware 143, API 145, or application program 147). The kernel 141 provides an interface that allows the middleware 143, the API 145, or the application 147 to access the individual components of the electronic device 101 to control or manage the system resources. The application 147 can include a host application acting as a hub for user information, notifications, recommendations, and other content. A host application can be a display surface such as an intelligent assistant or digital assistance voice client, an intelligent assistant or digital assistant home user interface or recommendation user interface, etc. The host application can be displayed as a home screen on the electronic device 101 that interacts with other applications installed in the memory 130 of the electronic device 101, and with outside services such as services offered by mobile network service providers, device manufacturers, cloud computing services, or other services. The host application can also operate as a component of the operating system of the electronic device 101. The application 147 can also include other applications pre-installed on the electronic device 101 or installed by a user of the electronic device 101. Such applications can include applications that provide travel services, music services, news services, shopping services, video services, or other services. These functions can be performed by a single application, or multiple applications that each carry out one or more of these functions.

The middleware 143 can function as a relay to allow the API 145 or the application 147 to communicate data with the kernel 141, for example. A plurality of applications 147 can be provided. The middleware 143 is able to control work requests received from the applications 147, for example, by allocating the priority of using the system resources of the electronic device 101 (such as the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (such as a command) for filing control, window control, image processing or text control.

The IO interface 150 serves as an interface that can, for example, transfer commands or data input from a user or other external devices to other component(s) of the electronic device 101. Further, the IO interface 150 can output commands or data received from other component(s) of the electronic device 101 to the user or the other external device.

The display 160 includes, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as signals received by the communication interface 170 regarding content provider content and user interface displays, content schema, or other data, and signals transmitted by the communication interface 170 including content queries, filled or partially-filled content schema, content display specifications, or other data.

The electronic device 101 further includes one or more sensors that can meter a physical quantity or detect an activation state of the electronic device 101 and convert metered or detected information into an electrical signal. For example, a sensor can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) can further include a control circuit for controlling at least one of the sensors included therein. Any of these sensor(s) can be located within the electronic device 101.

The wireless communication is able to use at least one of, for example, long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of operations executed on the electronic device 101 can be executed on another or multiple other electronic devices (such as the electronic devices 102 and 104 or server 106).

Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 104 or server 106 via the network 162, the electronic device 101 may be independently operated without a separate communication function, according to embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. The server 106 can also include an event processing module (not shown) that may support the event processing module 180 implemented in the electronic device 101. For example, the event processing module 180 can process at least a part of information obtained from other elements (such as the processor 120, the memory 130, the input/output interface 150, or the communication interface 170) and can provide the same to the user in various manners.

While in FIG. 1 the event processing module 180 is shown to be a module separate from the processor 120, at least a portion of the event processing module 180 can be included or implemented in the processor 120 or at least one other module, or the overall function of the event processing module 180 can be included or implemented in the processor 120 or another processor. The event processing module 180 can perform operations according to embodiments of this disclosure in interoperation with at least one program 140 stored in the memory 130.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
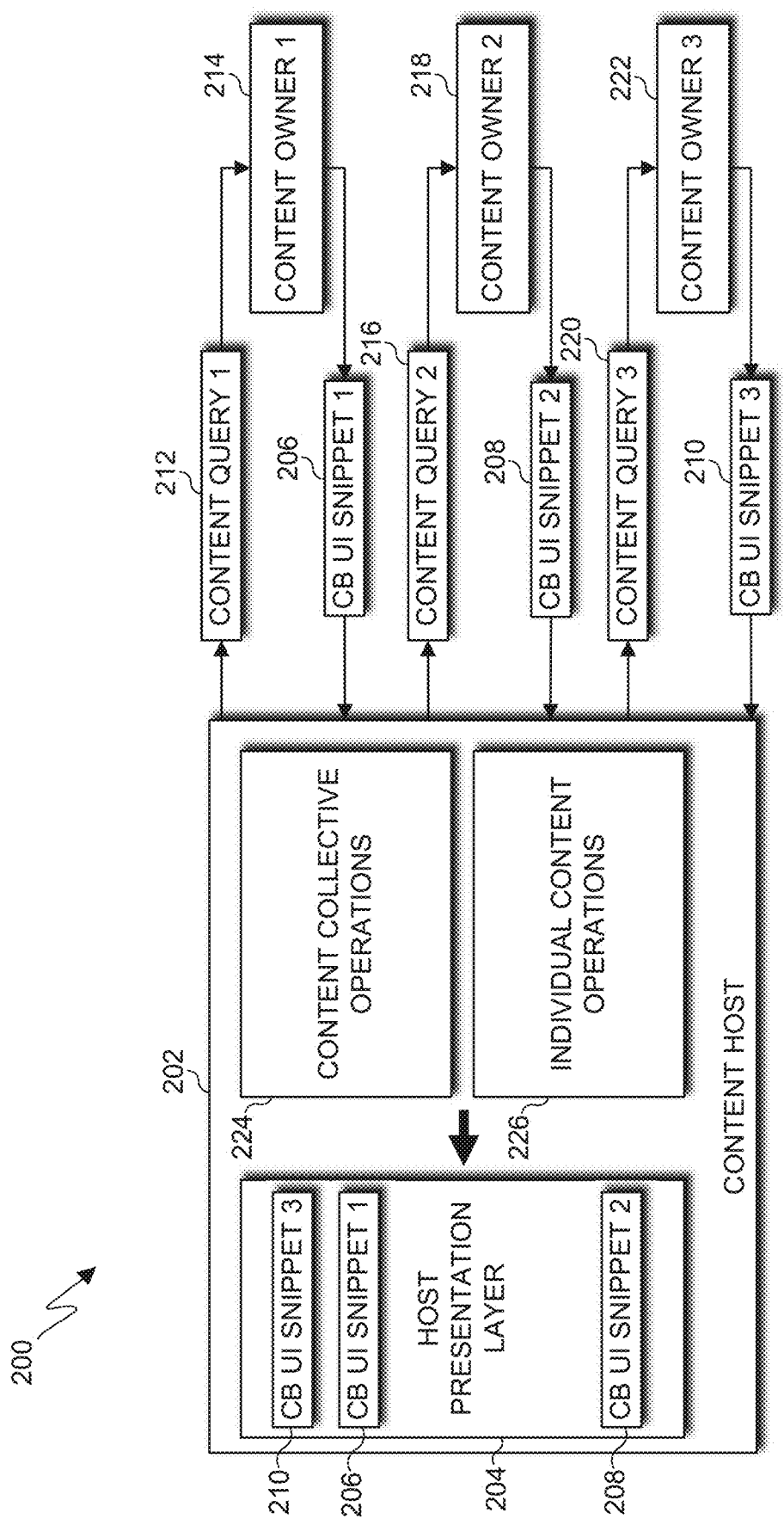
FIG. 2 illustrates an example content-backed user interface (UI) system in accordance with various embodiments of this disclosure.

FIG. 2 illustrates an example content-backed (CB) user interface (UI) system 200 in accordance with various embodiments of this disclosure. The system 200 includes a content host 202. The content host 202 can be a host application on, for example, the electronic device 101 and executed by the processor 120. The host application can act as a hub for user information, notifications, recommendations, and other content. The host application can be a display surface, such as an intelligent assistant or digital assistance voice client, an intelligent assistant or digital assistant home user interface or recommendation user interface, etc. In some embodiments, the host application can be displayed as a home screen on the electronic device 101 that interacts with other applications installed in the memory 130 of the electronic device 101 and with outside services, such as services offered by mobile network service providers, device manufacturers, cloud computing services, or other services. The host application can also operate as a component of the operating system of the electronic device 101. The content host 202 can also run or be executed on other devices, such as the electronic devices 102 and 104 or the server 106.

The content host 202 includes a host presentation layer 204. The host presentation layer 204 is a layer of the content host 202 that displays content to a user on a display surface or other mechanism for presenting content to a user. The host presentation layer 204 is configured to present content-backed UI snippets from a plurality of content owners. Content-backed UI snippets can include user interfaces for the display of information of, or allowing user interactability with, services offered by content owners. For instance, a hotel booking service can provide to the content host 202 a content-backed UI snippet that includes information related to viewing available hotels in geographic areas, searching available hotels, and booking hotels, along with display information defined by the hotel booking service provider defining how the information is to be presented to the user, such as the arrangement of content like text, images, background formatting, or other display information.

The content host 202 uses the information provided in the content-backed UI snippet to present the content of the content-backed UI snippet in the host presentation layer 204 in accordance with the display parameters provided in the content-backed UI snippet. Content-backed UI snippets thus provide for the display of content in a manner that is consistent with how content is usually displayed by content providers. For example, the hotel booking service may have a specific look and feel that is familiar to its users, such as specific text fonts, images, branding and logos, backgrounds, specific arrangements of text around images, specific search results formats, or specific ways users interact with the interface like ways users enter information through the interface.

The host presentation layer 204 is configured to present any number of content-backed UI snippets. For example, as illustrated in FIG. 2, the host presentation layer 204 can present or display a first content-backed UI snippet 206, a second content-backed UI snippet 208, and a third content-backed UI snippet 210. The content host 202 can display the content-backed UI snippets in different areas of the host presentation layer 204 and in variable orders, positions, or other arrangements as defined by the host while retaining the original nature of the UI snippets as defined by the content providers. The example illustrated in FIG. 2 shows the host presentation layer 204 presenting the third content-backed UI snippet 210 in an upper portion of the host presentation layer 204, the first content-backed UI snippet 206 below the third content-backed UI snippet 210 in the upper portion of the host presentation layer 204, and the second content-backed UI snippet 208 below the first and third content-backed UI snippets 206, 210 in a lower portion of the host presentation layer 204.

To receive content-backed UI snippets from content owners, the content host 202 transmits content queries to the content providers. The queries can be on-device communications between the content host 202 running as a host application on a user device, such as the electronic device 101, and content provider applications installed and/or running on the user device. The queries can also be sent from the content host 202 running as an application on a user device to content provider servers, such as the server 106 or other data storage locations that provide content from the content providers. In some embodiments, queries can be sent from the content host 202 to a content provider application, and the content provider application forwards the query to a server, receives the content, and provides the content to the content host 202.

FIG. 2 also illustrates an example content query process. As illustrated in FIG. 2, the content host 202 executed by the processor 120 can transmit a first content query 212 to a first content owner 214. The content owner can be a provider of content, such as an application or digital service running on the same device as the content host 202 like the electronic device 101 or remotely like the electronic device 102 or 104 or the server 106. In some embodiments, the content host 202 communicates with content owners through the server 106, and the server 106 transmits data between the content host 202 and the content owners. The first content owner 214 responds to the first content query 212 by transmitting the first content-backed UI snippet 206 to the content host 202. The content host 202 also transmits a second content query 216 to a second content owner 218, and the second content owner 218 responds by transmitting the second content-backed UI snippet 208 to the content host 202. The content host 202 transmits a third content query 220 to a third content owner 222, and the third content owner 222 responds by transmitting the third content-backed UI snippet 210 to the content host 202. In some embodiments, content can be queried in real time.

It will be understood that the first, second, and third content queries 212, 216, 220 can be transmitted in any order and that the first, second, and third content-backed UI snippets 206, 208, 210 can be transmitted by the content owners 214, 218, 222 and received by the content host 202 in any order. The content-backed UI snippets 206, 208, 210 can also be presented in the host presentation layer 204 simultaneously or can be added to the host presentation layer 204 at different points in time. If presented at different points in time, the content host 202 can rearrange the content-backed UI snippets as needed to fit within the host presentation layer 204 or display surface of the content host 202.

The content host 202 also includes a content collective operations module 224 and an individual content operations module 226. The individual content operations module 226, as executed by the processor 120, performs operations on individual content-backed UI snippets, such as validation, relevancy scoring, time to live (TTL) operations, or other operations. The content collective operations module 224, as executed by the processor 120, performs operations on a collected group of content-backed UI snippets, such as applying user references, ranking or ordering of UI snippets, positioning of UI snippets, or other operations. The content host 202 thus can control the presentation strategies of the UI snippets dynamically as content is received by the content host 202. As such, presentation of the shared contents provided in the content-backed UI snippets is mutually controlled by the host and the content provider. The content host 202 can control the collective presentation of contents from different sources, while the content provider provides content-backed UI snippets that format the content to the content providers' specifications within a portion of the host presentation layer 204 that the content host 202 determines to place the content. The content host 202 can also follow context evaluation guidelines for the shared content and can control the presentation timing and expiry of the shared content.

Figure 3:
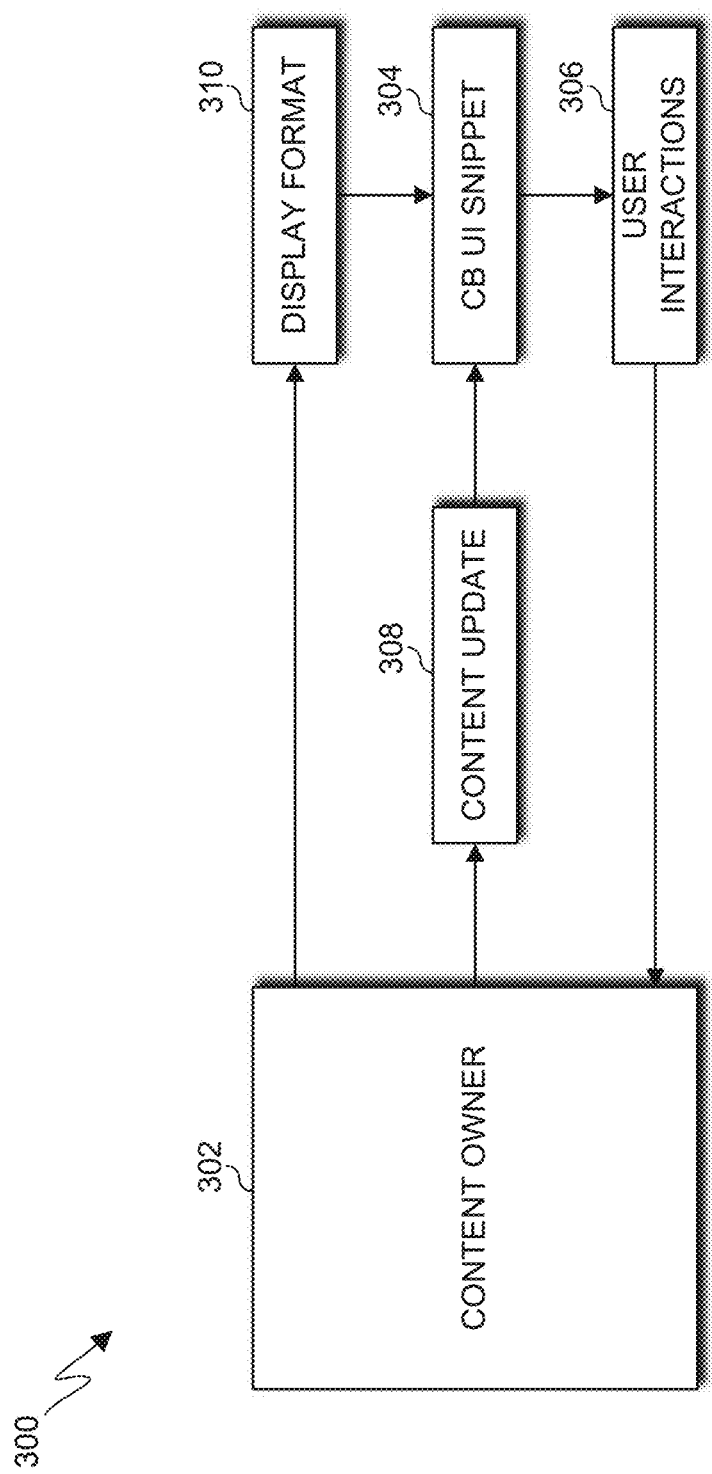
FIG. 3 illustrates an example content-backed UI snippet update process in accordance with various embodiments of this disclosure.

FIG. 3 illustrates an example content-backed UI snippet update process 300 in accordance with various embodiments of this disclosure. Content owners can update content-backed UI snippets with additional information or display formatting. For instance, if a user is interacting with a content-backed UI snippet for purchasing movie tickets, the initial UI snippet presented to the user in the host application may display a list of available movie titles with various graphics or other user interface designs, such as images for the respective movie titles. When the user selects a movie title, the UI snippet updates with a subsequent user interface that allows the user to view information about the selected movie title. Further subsequent user interfaces may be displayed, such as user interfaces for purchasing tickets, viewing purchased tickets, viewing directions to a movie theater, or other user interfaces. According to various embodiments of this disclosure, as a user continues to interact with a user interface, content owners can dynamically update the user interface presented to the user in the host application display surface.

As illustrated in FIG. 3, a content owner 302 can update a content-backed UI snippet 304. The content owner 302 can be a provider of content, such as an application or digital service running on the same device as a content host like the electronic device 101 or remotely like the electronic device 102 or 104 or the server 106. The content-backed UI snippet 304 can already be presented in a host application display surface according to content and display formatting previously provided by the content owner 302 to the host application. As a user interacts with the content-backed UI snippet 304, user interactions 306 are transmitted to the content owner 302. Based on the user interactions 306, the content owner 302 can update the content-backed UI snippet 304 by transmitting at least one of a content update 308 and a display format 310. The content update 308 can update the content-backed user interface snippet 304 with updated content, such as new images, text, user interface objects like buttons, dropdown menus, text fields, or other objects, multimedia content, or other updated content.

The content owner 302 can provide the display format 310 for specifying how the host application is to arrange the content. In some situations, the host application can override the display format 310 if the host application cannot display the content according to the display format 310, such as if the display format 310 specifies a size for the content that is too large for the display surface of the host application. In this manner, the content owner 302 can control the look and feel of UI snippets, directly control user interactions with the UI components of the UI snippets, and dynamically update the UI snippets based on user interactions or based on other events. For instance, if a user does not interact with the UI snippet 304 for a certain period of time, the content owner 302 can transmit at least one of a content update 308 and a display format 310 to alter the appearance of the UI snippet 304, such as to alert the user of a lack of activity or a time out.

Figure 4:
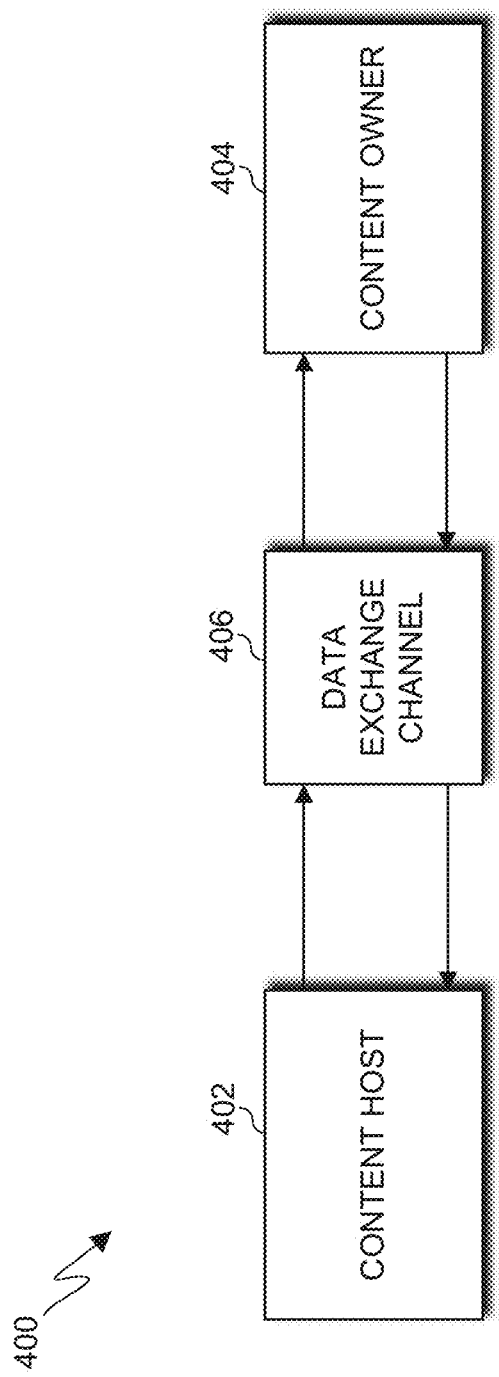
FIG. 4 illustrates an example communication system between a content host and a content owner in accordance with various embodiments of this disclosure.

FIG. 4 illustrates an example communication system 400 between a content host 402 and a content owner 404 in accordance with various embodiments of this disclosure. The content host 402 can represent the content host 202 and can be a host application on, for example, the electronic device 101 and executed by the processor 120. The host application can act as a hub for user information, notifications, recommendations, and other content. A host application can be a display surface, such as an intelligent assistant or digital assistance voice client, an intelligent assistant or digital assistant home user interface or recommendation user interface, etc. In some embodiments, the host application can be displayed as a home screen on the electronic device 101 that interacts with other applications installed in the memory 130 of the electronic device 101 and with outside services, such as services offered by mobile network service providers, device manufacturers, cloud computing services, or other services. The host application can also operate as a component of the operating system of the electronic device 101. The content host 402 can also run or be executed on other devices, such as the electronic devices 102 and 104 or the server 106. The content owner 404 can represent the content owner 302 or any of the content owners 214, 218, 222. The content owner 404 can be a provider of content, such as an application or digital service running on the same device as the content host 402 like the electronic device 101 or remotely like the electronic device 102 or 104 or the server 106.

As illustrated in FIG. 4, the content host 402 and the content owner 404 exchange data, such as content queries transmitted from the content host 402 to the content owner 404 or UI snippets transmitted from the content owner 404 to the content host 402 via a data exchange channel 406 or inter-app data transfer mechanism. The data exchange channel 406 is an asynchronous channel for transmitting queries from the content host 402 to the content owner 404 and for providing content to the content host 402 from the content owner 404. Data transmitted through the data exchange channel 406 can be serialized and de-serialized at the ends of the channel 406.

Queries for content transmitted through the data exchange channel 406 can be content provider specific, such as transmitting a content provider uniform resource identifier (URI) with various query parameters or sending a slice URI with query parameters like an ANDROID slice URI for requesting and displaying remote content. In some embodiments, the query can be an intent, free-form query with bundle parameters, which can provide for an operating system agnostic query. Also, in some embodiments, the data exchange channel 406 can be disposed on the same device as the content host 402 like the electronic device 101 or on a device of the content owner 404 like the electronic device 102 or 104 or the server 106. Further, in some embodiments, the data exchange channel 406 can be disposed on and executed by a server, such as the server 106, with communications from the content host 402 or the content owner 404 being sent to the server for serialization or de-serialization and retransmission to the content host 402 or the content owner 404.

Figure 5:
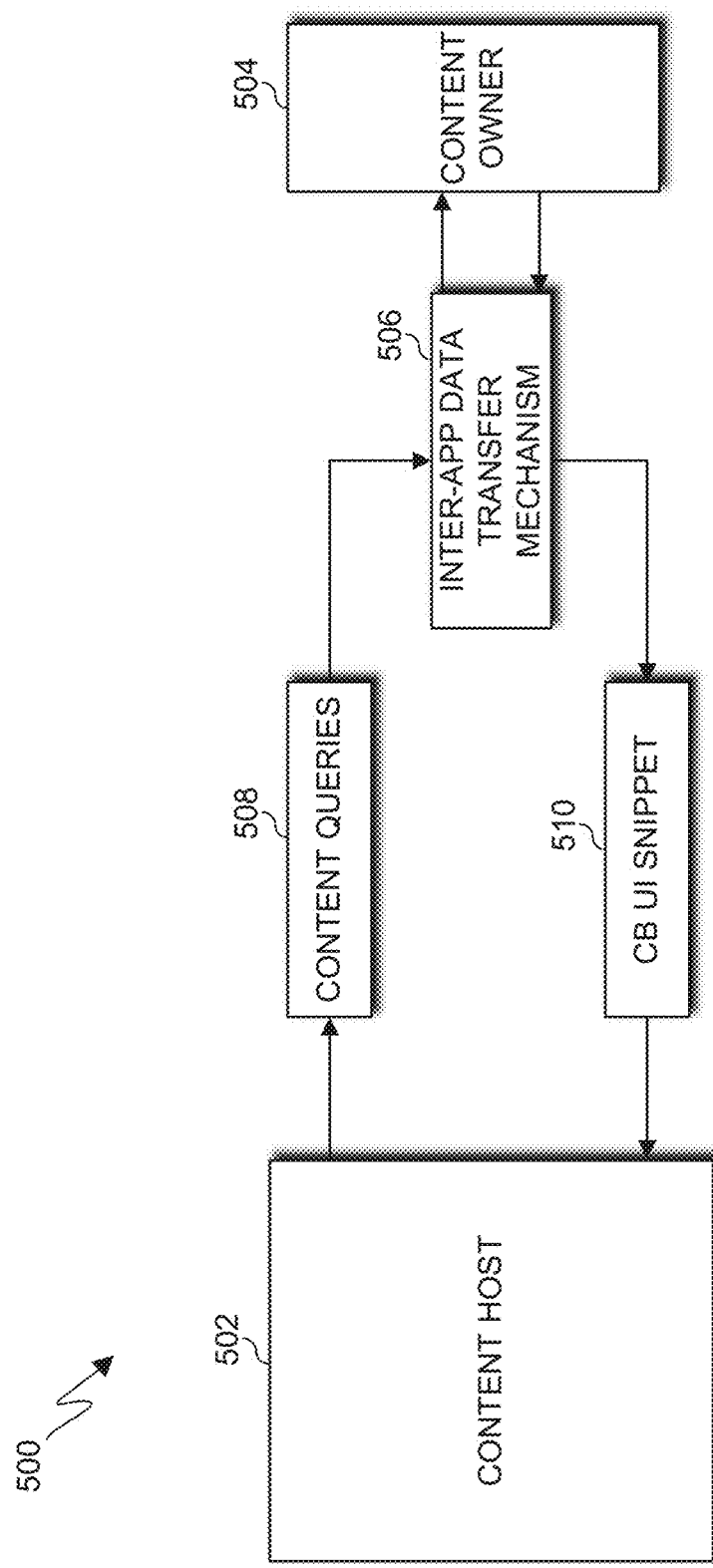
FIG. 5 illustrates an example content querying system in accordance with various embodiments of this disclosure.

FIG. 5 illustrates an example content querying system 500 in accordance with various embodiments of this disclosure. The system 500 includes a content host 502 that communicates with a content owner 504 through an inter-app data transfer mechanism 506. The content host 502 can represent the content host 202 or 402 and can be a host application on, for example, the electronic device 101 and executed by the processor 120. The host application can act as a hub for user information, notifications, recommendations, and other content. A host application can be a display surface, such as an intelligent assistant or digital assistance voice client, an intelligent assistant or digital assistant home user interface or recommendation user interface, etc. In some embodiments, the host application can be displayed as a home screen on the electronic device 101 that interacts with other applications installed in the memory 130 of the electronic device 101 and with outside services, such as services offered by mobile network service providers, device manufacturers, cloud computing services, or other services. The host application can also operate as a component of the operating system of the electronic device 101. The content host 502 can also run or be executed on other devices, such as the electronic devices 102 and 104 or the server 106. The content owner 504 can represent the content owner 302 or 404 any of the content owners 214, 218, 222. The content owner 504 can be a provider of content, such as an application or digital service running on the same device as the content host 502 like the electronic device 101 or remotely like the electronic device 102 or 104 or the server 106

The inter-app data transfer mechanism 506 can, in some embodiments, represent the data exchange channel 406 described with respect to FIG. 4. In some embodiments, the inter-app data transfer mechanism 506 can be disposed on the same device as the content host 502 like the electronic device 101 or on a device of the content owner 504 like the electronic device 102 or 104 or the server 106. In some embodiments, the inter-app data transfer mechanism 506 can be disposed on and executed by a server, such as the server 106, with communications from the content host 502 or the content owner 504 being sent to the server and the inter-app data transfer mechanism 506 for serialization or de-serialization and retransmission to the content host 502 or the content owner 504.

The content host 502 transmits content queries 508 through the inter-app data transfer mechanism 506, which can serialize the content queries 508 and the contents of the content queries like content schema and content user interface display specifications. The inter-app data transfer mechanism 506 passes the content queries 508 to the content owner 504 and can de-serialize the queries 508. The content owner 504 can transmit CB UI snippets 510 to the content host 502 through the inter-app data transfer mechanism 506, which can serialize and de-serialize the CB UI snippet 510 or their contents.

Figure 6:
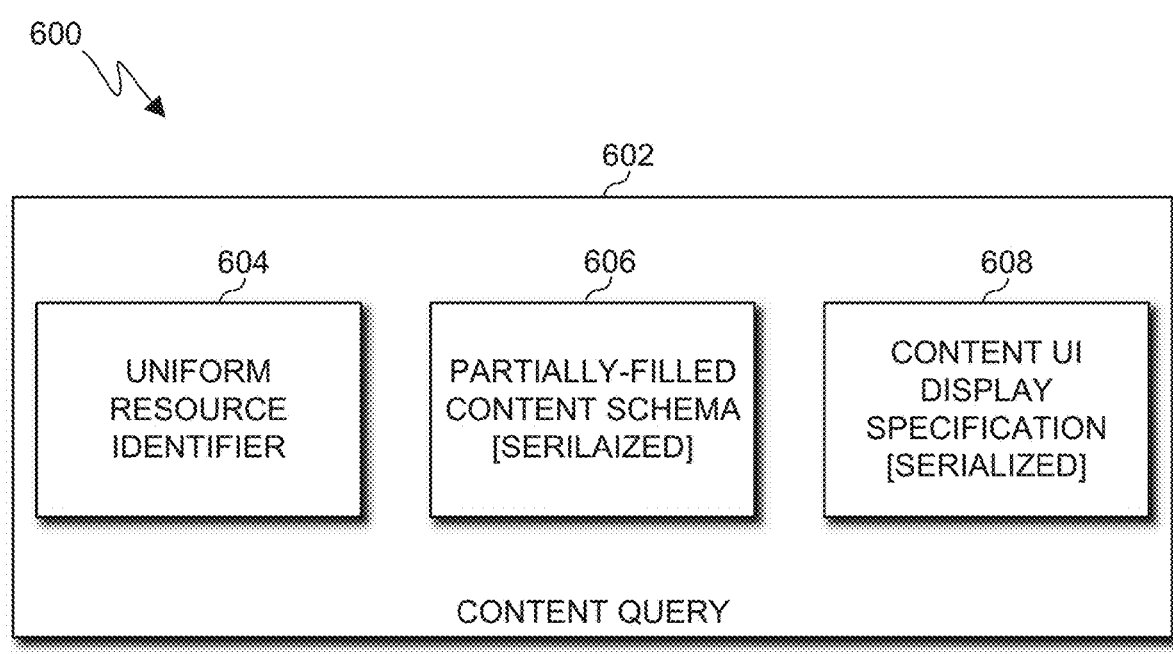
FIG. 6 illustrates an example configuration of a content query in accordance with various embodiments of this disclosure.

FIG. 6 illustrates an example configuration 600 of a content query 602 in accordance with various embodiments of this disclosure. The content query 602 can represent the structure of content queries, such as the content queries 212, 216, 220, 508, transmitted by a content host, such as the content hosts 202, 402, 502. The content query 602 includes a URI 604 that identifies the content owner from which content is to be requested by the query 602. The content query 602 also includes a partially-filled content schema 606 that can be serialized. A content schema is a structured representation of domain-specific content with predefined properties and can be pre-filled with any known data. A domain refers to the type of content or content owner. For example, a cab booking content owner and a flight booking content owner can be in the same domain, a travel domain, or can be regarded as residing in separate flight and cab domains. As another example, a music player application is not in the travel domain but is in a music domain, while another application offering music entertainment news can be considered within the same domain as the music player application.

The predefined properties of a content schema are attributed with criteria, such as data pertaining to a specific property. The content schema allows room for contextual metadata, such as domain- and provider-specific metadata. An example content schema can include:

```
- Content Schema
  - Domain Info
    - Name
    - Child of [Domain Info]
    - Related to [Domain Info]
    - Domain Navigation Path [Domain info1 -> Domain info 2 -> . . . n]
    - Domain Properties
    - Value Type
    - Optional / Mandatory
      - Validation Spec
      - Bounds
      - Matches
  - Context Info
    - Keywords
    - Related To [Domain Info]
    - Location
    - Activity tracks
  - Preference Spec
    - Preference signal 1
    - Preference signal 2
```

Preference specifications with preference signals can include various parameters defining user affinity to a content domain at a given time, such as content engagement vs. time of day, content engagement vs. time of the week, and/or a weekday vs. weekend matrix. A content host can have access to certain schema criteria and use the known criteria to create a partially-filled content schema 606. For example, before sending the content query 602 to the content owner, the content host might have access to information such as a user's location, a content owner domain, or user preferences. The known information is used to create the partially-filled schema 606, which can be serialized and included with the URI 604 in the content query 602 to provide certain known data to the content owner.

The content query 602 also includes a content user interface display specification 608. A display specification is a representation of a display surface's dimensions and other features, which can be serialized and added to the URI 604 in the content query 602 to provide the content owner with information pertaining to the display surface of the content host. The display specifications 608 can include display surface specifications, such as display height, display width, display orientation, display background specifications, margin specifications, corner specifications, units of measurement, or other specifications. An example serialized version of a content display specification 608 that can be passed to a content provider in a query 602 can include the following:

```
{
    "surface_type": "mini_card",
    "disp_height": 120,
    "disp_width": "480",
    "disp_orientation": "P",
    "margin_spec": [0, 0, 0, 0],
    "corner_spec": [0, 0, 0],
    "background": {"theme":"current_theme", "color":"#FEBEBE",
                   "tint":"#1BACBCCD", "elevation":"3"},
    "unit": "dp"
}
```

A query 602 including a URI 604, a partially-filled content schema 606, and a display specification 608 can be sent to a content provider to request a content-backed UI snippet from the content owner. In some embodiments, the content query 602 can include a slice URI with query parameters, such as a content provider's user interface with content schema. Also, in some embodiments, the content query can include an intent query with bundle parameters, which provides a freeform and operating-system-agnostic query.

Figure 7:
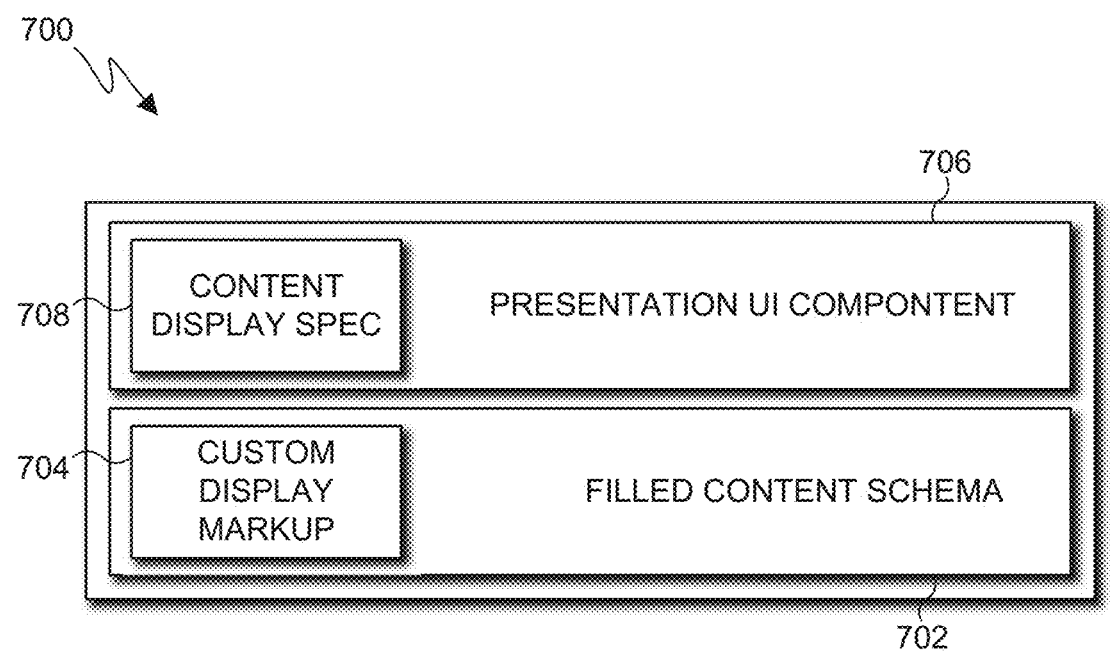
FIG. 7 illustrates an example content-backed UI snippet in accordance with various embodiments of this disclosure.

FIG. 7 illustrates an example content-backed UI snippet 700 in accordance with various embodiments of this disclosure. The content-backed UI snippet 700 is a structure that represents the actual content and its presentation and can represent the structure of the UI snippets 206, 208, 210, 304, 510 disclosed here. In some embodiments, the content-backed UI snippet 700 can include a JavaScript Object Notation (JSON) serialized content object with XML custom display formats. Also, in some embodiments, the content-backed UI snippet 700 can include a UI with slices including a content object as metadata.

The content-backed UI snippet 700 includes a filled content schema 702 that includes at least one custom display markup (CDM) 704. Custom display markups can also be referred to as content display manifests. The content-backed UI snippet 700 also includes a presentation UI component 706 having a content display specification 708. The filled content schema 702 is a raw content object, and the presentation UI component 706 controls presentation of the associated content schema 702. The content display specification 708 can be the same as or similar to the content display specification received in a content query from a content host, such as the content display specification 608 sent in the content query 602.

In some situations, the content display specification 708 included in the content-backed UI snippet 700 can deviate from a content display specification received in a content query if the presentation UI component 706 is unable to match the content display specification received in the content query. In such a situation, the presentation UI component 706 can include a content display specification 708 that is a modified version of the display specification received in the content query. A content owner can modify the content display specification to match the content owner UI, such as by providing the closest matching dimension of the UI dimension with the requested display specification. The content display specification 708 in the content-backed UI snippet 700 can be deemed compliant with the content host display specification or can be deemed noncompliant. In some cases, a modified content display specification can still be compliant with the content host display specification received in a content query if the display specification includes slight modifications.

The CDM 704 is a markup structure for defining custom presentation formats for the content schema and specifies the generic presentation formats with a mapping to content properties. The CDM 704 is used to present the content when there is not a presentation UI component 706 or when the presentation UI component 706 does not match the presentation parameters of the host. A CDM 704 can be in the following model to map content properties to associated display properties:

```
- Custom Display Markup
  - Primary Text
    -Content Property 1
    -Foreground Spec
    -Background Spec
  - Secondary Text
    -Content Property 2
    -Foreground Spec
    -Background spec
  - Primary Image
    -Content Property 3
    -Image scale spec
  - Thumbnail Image
    -Content Property 4
    -Image scale spec
```

Figure 8:
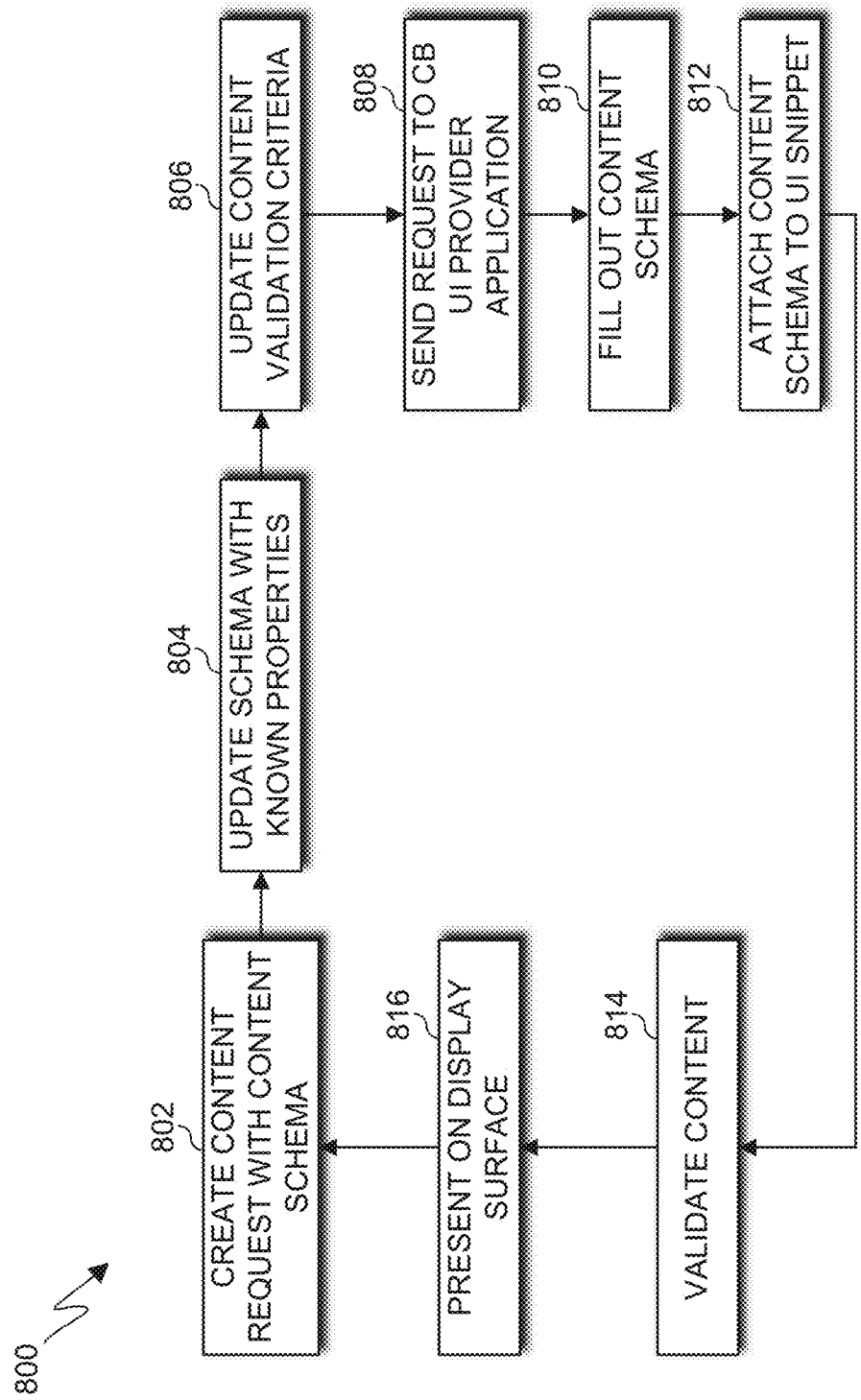
FIG. 8 illustrates a flowchart of an example content-backed UI snippet querying process in accordance with various embodiments of this disclosure.

- Portrait aspect ratio
- Land scape aspect ratio
- Shadow level
- Display card elevation FIG. 8 illustrates a flowchart of an example content-backed UI snippet querying process 800 in accordance with various embodiments of this disclosure. FIG. 8 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the process 800 is described with respect to the processor 120 of any, or a combination, of the electronic devices 101, 102, or 104 or the server 106. However, the process 800 can be used with any other suitable device(s) and in any suitable system.

At block 802, the processor of the host creates a content request including content schema as described in various embodiments of this disclosure. The content schema allows the host to provide a domain-specific content format with the query. At block 804, the processor of the host updates the content schema with known properties to create at least a partially-filled content schema. In some embodiments, a fully-complete content schema can be created at block 804 if the properties for the complete content schema are known. Other known contextual signals can also be added to the content schema. At block 806, the processor of the host updates content validation criteria, which are criteria a host uses to validate that UI snippets are compliant with the content host display specifications. The validation criteria specify mandatory or optional properties for content.

At block 808, the processor of the host sends the request to a content-backed UI provider application. At block 810, the processor of the content provider application fills out the content schema with other properties known to the content provider and can also update any properties in the partially-filled schema that are inconsistent with the properties known to the content provider. At block 812, the processor of the content provider attaches a content schema to a UI snippet and sends the UI snippet to the host. At block 814, the host validates the UI snippet, such as by determining if the UI presentation component of the UI snippet complies with the content display specification of the host. If not, the processor of the host can build a custom UI for the content from the content provider. At block 816, the processor of the host displays the content-backed UI snippet on the display surface of the host.

Figure 9:
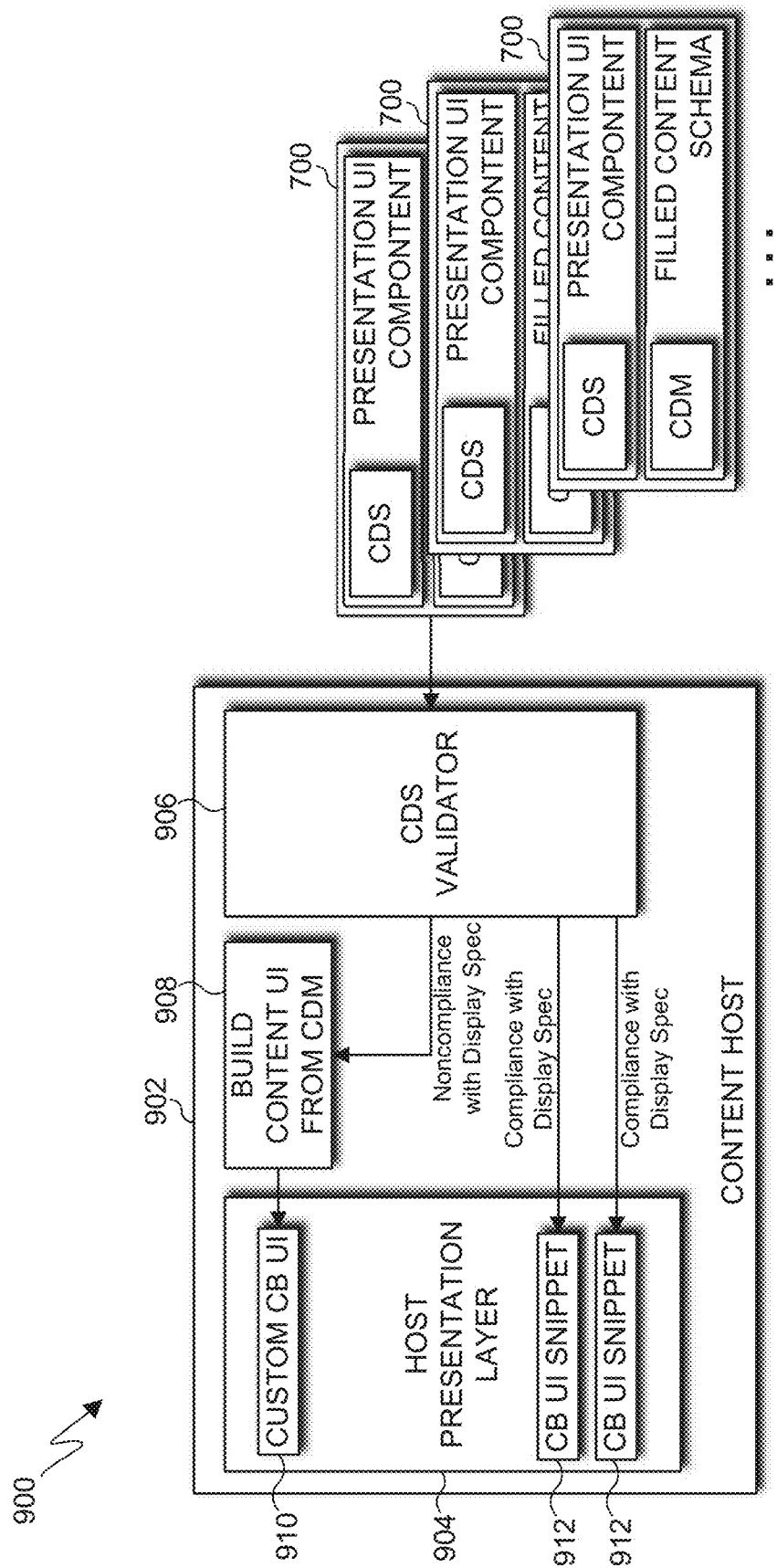
FIG. 9 illustrates an example content validation system of a content host in accordance with various embodiments of this disclosure.

FIG. 9 illustrates an example content validation system 900 of a content host 902 in accordance with various embodiments of this disclosure. The content host 902 can represent the content host 202, 402, 502 and can be a host application on, for example, the electronic device 101 and executed by the processor 120. The host application can act as a hub for user information, notifications, recommendations, and other content. A host application can be a display surface, such as an intelligent assistant or digital assistance voice client, an intelligent assistant or digital assistant home user interface or recommendation user interface, etc. In some embodiments, the host application can be displayed as a home screen on the electronic device 101 that interacts with other applications installed in the memory 130 of the electronic device 101 and with outside services, such as services offered by mobile network service providers, device manufacturers, cloud computing services, or other services. The host application can also operate as a component of the operating system of the electronic device 101. The content host 902 can also run or be executed on other devices, such as the electronic devices 102 and 104 or the server 106.

The content host 902 includes a content display specification (CDS) validator 906. The CDS validator 906 validates content-backed UI snippets 700 received by the content host 902 from content providers, such as by determining whether a content-backed UI snippet 700 complies with the display specification of the content host 902. If the content-backed UI snippet 700 complies with the display specification of the content host 902, the content host 902 presents a UI snippet 912 in a host presentation layer 904. If the content-backed UI snippet 700 does not comply with the display specification of the content host 902, at block 908, the CDS validator builds a custom content-backed UI 910 using one or more custom display markups (CDM) included in the content-backed UI snippet 700. For example, the content-backed UI snippet 700 may not comply with the display specification of the content host 902 because the device on which the content host 902 is executed is a different, incompatible platform or has a different screen size than that specified, such as if the display surface of the device has switched to a portrait view while the content-backed UI snippet 700 was created for a landscape view resulting in a width that is too large to display on the display surface of the device. The custom content-backed UI 910 can then be presented in the host presentation layer 904 in accordance with content collective operations performed by the content host, such as user preferences, ranking, positioned or other arranging of contents in the host presentation layer 904.

Figure 10:
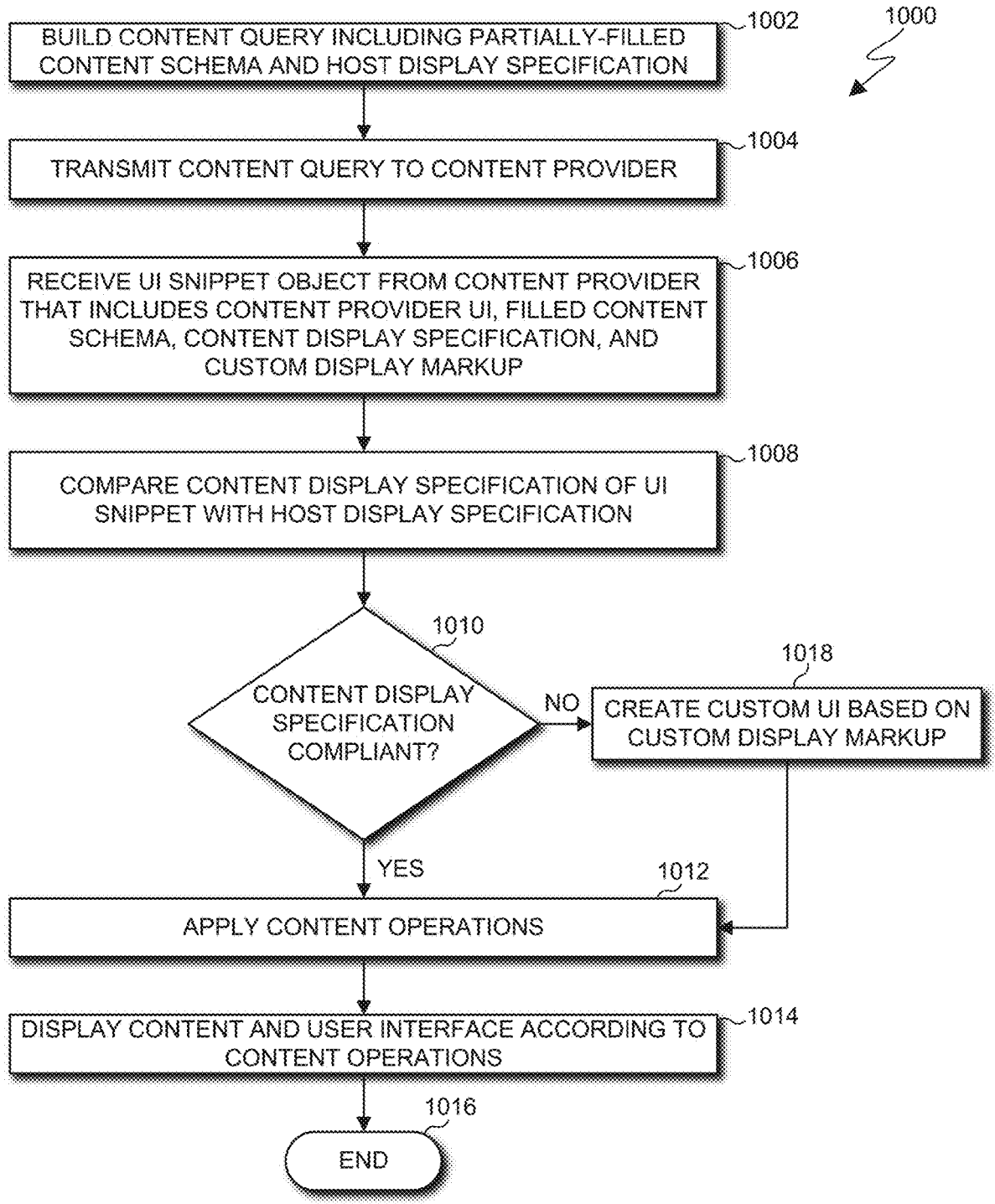
FIG. 10 illustrates a flowchart of an example content-backed user interface snippet presentation process in accordance with various embodiments of this disclosure.

FIG. 10 illustrates a flowchart of an example content-backed UI snippet presentation process 1000 in accordance with various embodiments of this disclosure. FIG. 10 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the process 1000 is described with respect to the processor 120 of any, or a combination, of the electronic devices 101, 102, or 104 or the server 106. However, the process 1000 can be used with any other suitable device(s) and in any suitable system.

At block 1002, the processor builds a content query including a partially-filled content schema and a host display specification in accordance with various embodiments of this disclosure. The query can also include a URI for identifying a content provider, an application, a service, or another resource. At block 1004, the processor transmits the query to a content provider, application, service, or other resource. At block 1006, the processor receives a content-backed UI snippet object from the content provider, application, service, or other resource. The content-backed UI snippet object includes a user interface, a filled content schema, a content display specification, and a custom display markup in accordance with embodiments of this disclosure.

At block 1008, the processor compares the content display specification provided in the content-backed UI snippet object with the host display specification. At decision block 1010, the processor determines if the content display specification provided in the content-backed UI snippet object complies with the host display specification. If so, the process 1000 moves to block 1012. At block 1012, the processor applies content operations to the content-backed UI snippet object including individual and collective content operations. For example, the processor can apply individual content operations, such as relevancy scoring or TTL operations. Relevancy scoring scores how relevant content is to the query transmitted in block 1004, and TTL operations determine the amount of time to keep the UI active or displayed and when to expire the UI. Content collective operations include operations affecting the arrangement of the content-backed UI snippet with respect to other content-backed UI snippets presented by the content host. For example, if the processor receives two or more UI snippets to display, the processor can determine the arrangement, order, or positions of the UI snippets on a display surface according to user preferences, default content ranking, order of transmission of queries or order of receipt of UI snippets, or other criteria.

At block 1014, the processor displays the content and user interface provided in the UI snippet on a display surface according to the results of the content operations performed in block 1012, and the process 1000 ends at block 1016. If the processor determines that the content display specification provided in the UI snippet is not compliant with the host display specification at decision block 1010, the process 1000 moves to block 1018. At block 1018, rather than using the specified UI included in the UI snippet, the processor creates a custom UI based on the custom display markup provided in the UI snippet in order to display the content provided in the UI snippet in accordance with the display parameters of the host. From block 1018, the process moves to block 1012 to apply content operations and moves to block 1014 to display the content using the custom UI according to the content operations. The process ends at block 1016.

Figure 11:
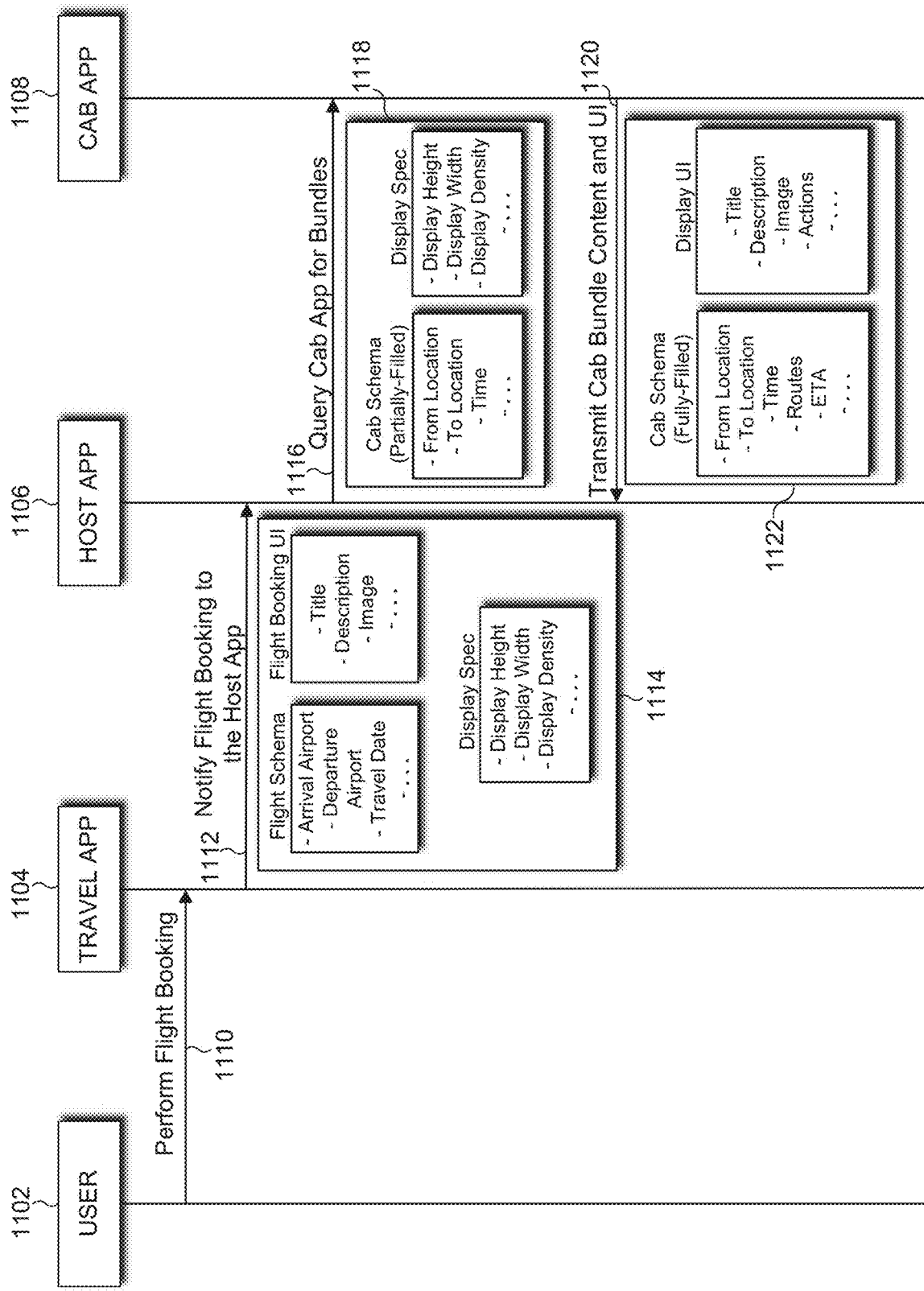
FIG. 11 illustrates a sequence diagram of an example cross-domain content display process in accordance with various embodiments of this disclosure.

FIG. 11 illustrates a sequence diagram of an example cross-domain content display process 1100 in accordance with various embodiments of this disclosure. For ease of explanation, the process 1100 is described with respect to the processor 120 of any, or a combination, of the electronic devices 101, 102, or 104 or the server 106. However, the process 1100 can be used with any other suitable device(s) and in any suitable system.

As illustrated in FIG. 11, various steps of the process 1100 are performed by a user 1102, a travel application content provider 1104, a host application 1106, and a cab or taxi application content provider 1108. At step 1110, the user 1102 performs a flight booking using the content provider application 1104 and can perform one or more other activities using the content provider application 1104. In some embodiments, the user 1102 can perform the flight booking at step 1110 by interacting with a UI snippet of the travel application 1104 presented by the host application 1106.

At step 1112, the travel application 1104 transmits one or more notifications to the host application 1106. The one or more notifications include content information, such as data and user interface information, related to the user activity performed in step 1110. For example, as illustrated in FIG. 11, the travel application 1104 transmits an object 1114 that includes flight application schema, flight booking UI information, and a display specification. The flight application schema can include information related to the flight booking, such as arrival airport information, departure airport information, travel date, and other information. The flight booking UI information can include titles, descriptions, images, and other user interface information. The display specification can include various display parameters for the host application 1106 to use in displaying the flight schema and flight booking UI content, such as a display height, a display width, a display density, or other display specifications.

At step 1116, the host application 1106 builds a content query 1118 and transmits the content query 1118 to the cab application 1108. The content query 1118 can include a URI related to the cab application 1108 and can include a partially-filled schema for the cab application, which can include information such as "from location" information, "to location" information, time information, and other information. Since the host application 1106 received at step 1112 included various information related to the user's flight booking from the travel application 1104, the host application can use this information to partially fill the cab content schema since the host application 1106 received information related to the user's travel timing, travel locations, and other information provided in the object 1114. In some embodiments, the user can initiate the cab booking process, triggering step 1116. In other embodiments, the host application 1106, using the information provided in the object 1114, can initiate step 1116 without user input to provide the user with a recommended action, such as booking a cab for after the user arrives at the arrival airport listed in the object 1114.

The content query 1118 also includes a display specification that can include display parameters for the host application, such as display height, display width, display density, or other display information. At step 1120, the cab application 1108 creates a content-backed UI object 1122 and transmits the object 1122 to the host application 1106. The object 1122 includes a fully-filled cab schema that can include the information provided in the content query 1118 and additional information filled in by the cab content owner application 1108. The fully-filled content schema can include information related to a cab booking, such as "from location" information, "to location" information, and time information, which are provided as illustrated in FIG. 11 by the content query 1118. In some embodiments, if any of the information provided in the partially-filled content schema in the content query 1118 is incorrect or can be updated, the cab application 1108 can modify the information provided by the content query 1118. The fully-filled content schema of the object 1122 also can include additional information provided by the cab application 1108, such as route information, estimated time of arrival (ETA) information, and other information.

The content-backed UI object 1122 also includes a display UI that can include user interface data, such as titles, descriptions, images, user interface action objects, or other data. The host application 1106 can use the display UI data in the object 1122 to determine if the UI provided by the object 1122 complies with the display specification of the host application. If so, the host application 1106 displays the UI on a display surface of the host application 1106 as provided in the object 1122. If the display UI of the object 1122 does not comply with the display specification of the host application 1106, the host application can use the information provided in the object 1122 to create a custom UI that complies with the display specification as described in various embodiments of this disclosure.

As FIG. 11 illustrates, cross-domain information can be used to display to users other possible or recommended actions based on the user's interactions with UI snippets. As illustrated in FIG. 11, for example, when a user interacts with an application in a first domain, whether in the application itself or in a UI snippet for the application presented in the host application, the host application can use information provided by the user and by the application in the first domain to query additional services in a second domain, any number of additional domains, or services in the same or similar domains. The host application can receive additional content-backed UI snippets for the additional applications or services and present the UI snippets to the user, allowing the user to interact with the UI snippets to accept the additional services. In some embodiments, the host application can fully complete additional services for the user, such as finalizing a cab booking for the user without user input.

The systems and methods described in this disclosure provide new standards for surfacing content with data, including a common object model for representing data with a domain-specific schema and providing a structured way to request UI snippets in a specific format. The host application is freed up from handling user interactions on content since, in some embodiments, the host application is responsible for surfacing the UI snippet while the UI snippet itself is predefined with results to take user interactions into account. More relevant content can be displayed when content queries are accompanied by a schema filled with known signals. Allowing the host to be aware of the content provides the host with more context for the related content queries, as the related applications can be queried for UI snippets when the contents are accompanied with the UI. The schema can also serve as the context and can insist that the content owner deliver the parameters associated with the displayed UI.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device comprising:
a memory; and
at least one processor coupled to the memory, wherein the at least one processor is configured to:
transmit, through an inter-application data exchange channel, a content query for content in a domain to a content owner, the content query comprising first contents including a partially-filled content schema that includes known domain data specific to the domain and to the content owner, wherein the inter-application data exchange channel is configured to serialize or deserialize the content query or the first contents of the content query;
receive through the inter-application data exchange channel from the content owner in response to the content query, a user interface object comprising second contents including a filled content schema, display content, and user interface data, wherein the inter-application data exchange channel is configured to serialize or deserialize the user interface object or the second contents of the user interface object;
validate the user interface object according to display parameters; and
display the display content.

2. The electronic device of claim 1, wherein:
the at least one processor is further configured to build the content query,
the content query includes the partially-filled content schema and a host display specification, and
the host display specification includes the display parameters.

3. The electronic device of claim 2, wherein the user interface object includes the filled content schema, a custom display markup, and a content display specification.

4. The electronic device of claim 3, wherein, to validate the user interface object according to the display parameters, the at least one processor is configured to:
determine that the content display specification of the user interface object does not comply with the display parameters of the host display specification;
build a custom user interface for the display content based on the custom display markup of the user interface object; and
display the custom user interface.

5. The electronic device of claim 1, wherein the at least one processor is further configured to:
receive at least one user input associated with the display content; and
trigger at least one action based on the at least one user input.

6. The electronic device of claim 1, wherein the at least one processor is further configured to display the display content in a host application presentation layer of the electronic device.

7. The electronic device of claim 6, wherein:
the at least one processor is further configured to display a plurality of cross-domain user interfaces in the host application presentation layer,
each one of the plurality of cross-domain user interfaces is based on one or more of a plurality of user interface objects,
each one of the plurality of user interface objects is associated with one or more cross-domain applications, and
each one of the plurality of user interface objects includes cross-domain information formatted based on a content schema and a content presentation user interface provided by the one or more cross-domain applications.

8. A method comprising:
transmitting, through an inter-application data exchange channel by an electronic device comprising a memory and at least one processor coupled to the memory, a content query for content in a domain to a content owner, the content query comprising first contents including a partially-filled content schema that includes known domain data specific to the domain and to the content owner, wherein the inter-application data exchange channel is configured to serialize or deserialize the content query or the first contents of the content query;
receiving through the inter-application data exchange channel from the content owner in response to the content query, a user interface object comprising second contents including a filled content schema, display content, and user interface data, wherein the inter-application data exchange channel is configured to serialize or deserialize the user interface object or the second contents of the user interface object;

validating, by the electronic device, the user interface object according to display parameters; and displaying, by the electronic device, the display content.

9. The method of claim 8, wherein:

the method further comprises building the content query, the content query includes the partially-filled content schema and a host display specification, and the host display specification includes the display parameters.

10. The method of claim 9, wherein the user interface object includes the filled content schema, a custom display markup, and a content display specification.

11. The method of claim 10, wherein validating the user interface object according to the display parameters includes:

determining that the content display specification of the user interface object does not comply with the display parameters of the host display specification;

building a custom user interface for the display content based on the custom display markup of the user interface object; and displaying the custom user interface.

12. The method of claim 8, further comprising:

receiving at least one user input associated with the display content; and triggering at least one action based on the at least one user input.

13. The method of claim 8, wherein:

the method further comprises displaying a plurality of cross-domain user interfaces, each one of the plurality of cross-domain user interfaces is based on one or more of a plurality of user interface objects, each one of the plurality of user interface objects is associated with one or more cross-domain applications, and each one of the plurality of user interface objects includes cross-domain information formatted based on a content schema and a content presentation user interface provided by the one or more cross-domain applications.

14. A non-transitory computer readable medium embodying a computer program for operating an electronic device including a memory and at least one processor, the computer program comprising computer readable instructions that, when executed by the at least one processor, cause the electronic device to:

transmit, through an inter-application data exchange channel, a content query for content in a domain to a content owner, the content query comprising first contents including a partially-filled content schema that includes known domain data specific to the domain and to the content owner, wherein the inter-application data exchange channel is configured to serialize or deserialize the content query or the first contents of the content query;

receive, through the inter-application data exchange channel from the content owner in response to the content query, a user interface object comprising second contents including a filled content schema, display content, and user interface data, wherein the inter-application data exchange channel is configured to serialize or deserialize the user interface object or the second contents of the user interface object;

validate the user interface object according to display parameters; and display the display content.

15. The non-transitory computer readable medium of claim 14, wherein:

the computer program further comprises computer readable instructions that, when executed by the at least one processor, cause the electronic device to build the content query, the content query includes the partially-filled content schema and a host display specification, and the host display specification includes the display parameters.

16. The non-transitory computer readable medium of claim 15, wherein the user interface object includes the filled content schema, a custom display markup, and a content display specification.

17. The non-transitory computer readable medium of claim 16, wherein the computer readable instructions that cause the electronic device to validate the user interface object comprise computer readable instructions that, when executed by the at least one processor, cause the electronic device to:

determine that the content display specification of the user interface object does not comply with the display parameters of the host display specification;

build a custom user interface for the display content based on the custom display markup of the user interface object; and display the custom user interface.

18. The non-transitory computer readable medium of claim 14, wherein the computer program further comprises computer readable instructions that, when executed by the at least one processor, cause the electronic device to:

receive at least one user input associated with the display content; and trigger at least one action based on the at least one user input.

19. The non-transitory computer readable medium of claim 14, wherein the computer program further comprises computer readable instructions that, when executed by the at least one processor, cause the electronic device to display the display content in a host application presentation layer of the electronic device.

20. The non-transitory computer readable medium of claim 19, wherein:

the computer program further comprises computer readable instructions that, when executed by the at least one processor, cause the electronic device to display a plurality of cross-domain user interfaces in the host application presentation layer, each one of the plurality of cross-domain user interfaces is based on one or more of a plurality of user interface objects, each one of the plurality of user interface objects is associated with one or more cross-domain applications, and each one of the plurality of user interface objects includes cross-domain information formatted based on a content schema and a content presentation user interface provided by the one or more cross-domain applications.

* * * * *